3,594,430
ALKYLATION OF AROMATIC HYDROCARBONS
George L. Hervert, Woodstock, Ill., assignor to Universal Oil Products Company, Des Plaines, Ill.
No Drawing. Continuation-in-part of application Ser. No. 686,690, Nov. 29, 1967. This application May 25, 1970, Ser. No. 40,455
Int. Cl. C07c 15/02, 15/14
U.S. Cl. 260—668C
10 Claims

ABSTRACT OF THE DISCLOSURE

The alkylation of aromatic hydrocarbons is effected in the presence of a novel catalyst comprising a hydrogen fluoride-carbon dioxide complex to prepare alkylated aromatic hydrocarbons possessing certain desirable configurations.

CROSS REFERENCE TO RELATED APPLICATION

This application is a continuation-in-part of my copending application Ser. No. 686,690, filed Nov. 29, 1967, now U.S. Pat. No. 3,531,546, issued Sept. 29, 1970.

This invention relates to a process for the alkylation of organic compounds, and particularly aromatic hydrocarbons, in the presence of certain catalytic compositions of matter. More particularly, the invention is concerned with the use of novel catalytic compositions of matter comprising a hydrogen fluoride-carbon dioxide complex to effect the alkylation of certain organic compounds whereby a desirable product is obtained.

Heretofore, it has been known to utilize acidic catalysts to effect certain reactions involving organic compounds such as hydrocarbons or substituted hydrocarbons. These acidic catalysts which have been used in the prior art include sulfuric acid, hydrogen fluoride, etc. However, when utilizing these catalysts only limited yields of the more desirable products are obtained. In order to increase the yield of the desirable products it is necessary to modify the catalyst system.

Certain alkylated aromatic hydrocarbons constitute useful compounds in the chemical industry. For example, isopropylbenzene(cumene) is used as an additive to aviation gasoline or as an intermediate in the production of phenol, acetone and α-methylstyrene all of which are useful and important chemical compounds. Likewise, diethylbenzene is useful as an intermediate in the preparation of other chemicals and as a solvent. Yet, another compound which may be prepared according to the process of this invention is 1,1-ditolylethane. This compound can be readily hydrocracked to yield toluene and p-ethyltoluene, the latter compound being a valuable intermediate for the production of terephthalic acid which is used in the production of synthetic resins, fibers, and films by combustion with glycols.

It is therefore an object of this invention to provide a process for effecting certain organic reactions in the presence of a novel catalyst system.

A further object of this invention is to provide a process for effecting certain organic reactions such as alkylation in the presence of a novel catalyst system comprising a hydrogen fluoride-carbon dioxide complex.

In one aspect an embodiment of this invention resides in a process for the liquid phase alkylation of an aromatic hydrocarbn by condensing said hydrocarbon with an alkylating agent in the presence of an alkylation catalyst at a temperature in the range from about −20° to about 150° C. and a pressure in the range of from about 10 to 2,000 pounds per square inch, the improvement which comprises utilizing as said catalyst a hydrogen fluoride-carbon dioxide complex containing from about 0.1 to about 95 wt. percent hydrogen fluoride.

A specific embodiment of this invention is found in the process of the alkylation of benzene which comprises condensing said benzene with propylene in the presence of a catalyst comprising a hydrogen fluoride-carbon dioxide complex containing from about 0.1 to about 95 wt. percent hydrogen fluoride at a temperature in the range of from about −20° to about 150° C. and at a pressure in the range of from about 10 to about 2,000 pounds per square inch, and recovering the resultant isopropylbenzene.

Other objects and embodiments will be found in the following further detailed description of the present invention.

As hereinbefore set forth, the present invention is concerned with a process for effecting the alkylation of aromatic hydrocarbons in the presence of a catalyst comprising hydrogen fluoride-carbon dioxide complex. The term "aromatic hydrocarbon" as used in the specification and appended claims will refer to both aromatic hydrocarbons and alkyl-substituted aromatic hydrocarbons of the type hereinafter set forth in greater detail. By utilizing the catalyst complex of the present invention, it is possible to modify the alkylation of aromatic hydrocarbons in order to obtain a preferred product distribution. In addition, it is also possible to effect the alkylation of aromatic hydrocarbons utilizing a lesser amount of the catalyst, thereby effecting corresponding decrease in the overall cost of the operation. In an addition to utilizing a lower inventory of hydrogen fluoride, it is also possible, by utilizing the catalyst complex of the present invention, to obtain an increased solubility of the reactants along with increased acidity of the reaction. This will lead in many instances to an isomerization reaction whereby the more desired isomers of the product are obtained. Furthermore, by utilizing the catalytic compounds of the present invention, it will be possible to obtain more primary alkylation reactions with the corresponding decrease in secondary and tertiary alkylation. This will, of course, be preferred when the desired product comprises a mono-alkylated aromatic compound rather than di- or poly-alkylated products.

Examples of aromatic hydrocarbons which may undergo alkylation according to the process of this invention will include benzene, toluene, ethylbenzene, n-propylbenzene, isopropylbenzene(cumene), n-butylbenzene, isobutylbenzene, t-butylbenzene, etc.; dialkylated aromatic hydrocarbons such as o-xylene, m-xylene, p-xylene, o-ethyltoluene, m-ethyltoluene, p-ethyltoluene, etc., and higher molecular weight dialkyl aromatic hydrocarbons sometimes referred to in the art as alkylate including hexyltoluene, nonyltoluene, dodecyltoluene, pentadecyltoluene, etc. In addition, it is also contemplated within the scope of this invention that polyalkylated aromatic hydrocarbons may also undergo alkylation according to the process of this invention, said hydrocarbons including 1,2,3-trimethylbenzene(hemimellitene), 1,2,4 - trimethylbenzene(pseudocumene), etc. Other suitable utilizable hydrocarbons include those with two or more aromatic groups such as diphenyl, diphenylmethane, triphenylmethane, fluorene, stilbene, etc., as well as aromatic hydrocarbons which contain condensed benzene rings including naphthalene, anthracene, phenanthrene, crysene, etc. The alkylaromatic hydrocarbons which may be alkylated according to the process of this invention comprises those which are subjected to the limitation that the alkyl-aromatic hydrocarbons contain adjacent unsubstituted carbon atoms (the alkylaromatic hydrocarbons must contain two carbon atoms in ortho-position to one another, these two carbon atoms being bound solely to other carbon atoms and to hydrogen).

The alkylating agent which may be utilized as one of the starting materials in the process of this invention will include olefins such as ethylene, propylene, 1-butene, 2-butene, 1-pentene, 2-pentene, 1-hexene, 2-hexene, 3-hexene, the isomeric heptenes, octenes, nonenes, decenes, undecenes, dodecenes, tridecenes, tetradecenes, pentadecenes, hexadecenes, heptadecenes, octadecenes, nonadecenes, eicosenes, etc.; aldehydes such as acetaldehyde, propionaldhyde, butylaldehyde, valeraldehyde, etc. In addition, it is also contemplated within the scope of this invention that carbohydrates may also be used to effect the alkylation of aromatic compounds, although not necessarily with equivalent results. Examples of carbohydrates that may be utilized as alkylating agents for the aromatic compounds include aldohexoses, and their di- tri- and poly forms. Simple aldohexoses which may be used include mannose, glucose, idose, gulose, galactose, talose, allose, and altrose. Utilizable aldohexose disaccharides which may be used include turanose, maltose, lactose, trehalose, etc. Various polysaccharides which yield aldohexoses during the reaction are also utilizable and will include starch, cellulose, dextran, etc.

The catalyst composition of the present invention comprises a hydrogen fluoride-carbon dioxide complex, said complex being formed due to the fact that hydrogen fluoride is miscible with the carbon dioxide. The hydrogen fluoride may be present in the catalyst complex in a range of from about 0.1 to about 95 weight percent of catalyst complex. In addition to the miscibility of the hydrogen fluoride with the carbon dioxide, in some instances it has been found that the reactant which is to undergo alkylation, isomerization, etc., may also be miscible with the carbon dioxide and thus a single phase may be used to effect the reaction. By utilizing this single phase, it is possible that a sizable reduction in the catalyst-reactant ratio may be effected as well as being able to utilize shorter contact times.

It is contemplated within the scope of this invention that the organic reactions which are to be effected utilizing the hydrogen fluoride-carbon dioxide complex may be effected at temperatures ranging from about $-20°$ C. up to about 150° C. and at pressures within the range of from about 10 to about 2,000 pounds per square inch, the most important consideration being that the reaction be effected under optimum conditions so that the maximum amount of hydrogen fluoride is miscible with the carbon dioxide in the liquid phase.

The process of this invention may be effected in any suitable manner and may comprise either a batch or continuous type operation. For example, when a batch type operation is used, a quantity of the aromatic hydrocarbon which is to be reacted is placed in an appropriate apparatus such as, for example, a stirred or rotated autoclave which contains the catalyst system comprising a hydrogen fluoride-carbon dioxide complex. If, for example, the organic reaction which is to be effected is an alkylation reaction, the alkylating agent is thereafter charged to the reactor which is maintained at the proper operating conditions of temperature and pressure for a predetermined residence time. At the end of this time, the reactor and contents thereof are allowed to return to room temperature and atmospheric pressure. At this point, when the vessel is returned to atmospheric pressure, the carbon dioxide and an appreciable amount of hydrogen fluoride will leave the reactor. The vessel is opened and the reaction mixture is separated from the remainder of the hydrogen fluoride in the catalyst system by conventional means and thereafter subjected to separation means such as fractional distillation, crystallization, etc., whereby the desired product which contains the modification of the products which are usually obtained with conventional catalysts is recovered.

It is also contemplated within the scope of this invention that the process may be effected in a continual manner of operation. When such a type of operation is used, a quantity of the aromatic hydrocarbon and alkylating agents is continuosly charged to the reaction zone which is maintained at the proper operating conditions of temperature and pressure. In addition, the catalyst complex is also continuously charged to the reaction zone through separate means. It is contemplated that the catalyst system may be prepared prior to entry into said reactor and charged thereto as a hydrogen fluoride-carbon dioxide complex, or the hydrogen fluoride and carbon dioxide may be charged to the reactor through separate means and admixed therein to form the catalyst complex in situ. Upon completion of the desired residence time, the reactor effluent is continuously withdrawn, the unreacted starting materials and catalyst complex are separated from the effluent and the latter is then subjected to fractionation means whereby the desired product is recovered.

The following examples are given to illustrate the process of the present invention which, however, are not intended to limit the generally broad scope of the present invention in strict accordance therewith.

Example I

In this example, 4 moles of toluene was placed in a 1 liter stainless steel turbomixer autoclave which was maintained at a temperature of approximately 0° C. by means of an ice bath. In addition, the autoclave also contained 0.57 mole of acetaldehyde and 20.7 moles of hydrogen fluoride. The autoclave was maintained at this temperature for a period of 0.5 hour at the end of which time the bulk of the hydrogen fluoride was purged from the reactor by utilizing a stream of nitrogen for approximately two hours. Following this, the autoclave was then opened and the reaction product was transferred to a beaker being placed in a separating funnel and water washed. A pentane solvent was used to scavenge the apparatus and the gleanings were then combined with the bulk product. The total hydrocarbon layer was separated from the dilute aqueous acid phase by decantation, was mixed with calcium carbonate to neutralize any hydrogen fluoride still present, filtered and subjected to fractional distillation to remove the pentane solvent and most of the unreacted toluene. The distillation bottoms were then submitted to gas liquid chromatography and infra-red analyses which disclosed the presence of a 90 mole percent yield of 1,1-ditolyl-ethanes.

To illustrate the advantage of using a hydrogen fluoride-carbon dioxide catalyst complex, a second experiment was performed in which 4.0 moles of toluene, 0.57 mole of acetaldehyde and only 11.7 moles of hydrogen fluoride were placed in a 1 liter stainless steel turbomixer autoclave. Following this, carbon dioxide was pressured into the sealed reactor until 28 wt. percent of the catalyst phase consisted of carbon dioxide. The autoclave and contents thereof were maintained at a temperature of approximately 0° C. for a period of 2.6 hours with stirring. At the end of this time, the carbon dioxide pressure was slowly released and the autoclave was allowed to reach room temperature. Thereafter the autoclave was purged of the hydrogen fluoride by using a stream of nitrogen as the purging agent for a period of approximately two hours. Thereafter, the autoclave was opened and the product recovered and water washed. The pentane solvent was again used to scavenge the apparatus and the gleanings were again combined with the bulk product. The hydrocarbon layer was separated from the dilute aqueous catalyst phase, the residual hydrogen fluoride within the hydrocarbon product was neutralized by the addition of calcium carbonate, the mixture was thereafter filtered and subjected to distillation to remove the pentane solvent and most of the unreacted toluene. The bottoms from the distillation were again subjected to analyses in a manner similar to that set forth in the above paragraph, said analyses disclosing the presence of a 94 mole percent yield of 1,1-ditolylethanes.

It is therefore apparent from a comparison of the two experiments that the use of a hydrogen fluoride-carbon dioxide complex will permit the obtention of a greater yield of alkylated products when using a lower hydrogen fluoride inventory.

Example II

In this example a 1 liter turbomixer containing 4 moles of benzene is charged with a hydrogen fluoride-carbon dioxide complex which contains about 30 wt. percent of carbon dioxide of the hydrogen fluoride inventory. The turbomixer is maintained at a temperature of about 5° C. by means of an ice bath. While maintaining the turbomixer at this temperature, the alkylating agent comprising propylene is charged thereto, the addition being effected during a period of about 60 minutes while maintaining the turbomixer under a pressure of 200 pounds per square inch. During the addition period, the reaction is subjected to a continuous stirring procedure, the stirring being continued for an additional contact time of about 5 minutes after completing the addition of the propylene. At the end of the reaction period, the carbon dioxide is released and the reactor is brought to room temperature, and the turbomixer is purged by passing a stream of nitrogen therethrough for a period of approximately two hours. At the end of this time, the mixer is opened and the reaction product is recovered and water washed. The reactor is then washed with a pentane solvent and the gleanings of the wash are combined with the bulk product. Thereafter, the organic layer is separated from the aqueous layer, neutralized with calcium carbonate to remove traces of residual hydrogen fluoride and subjected to fractional distillation whereby the desired product comprising isopropylbenzene(cumene) is recovered.

A repeat of the above experiment utilizing a catalyst consisting only of hydrogen fluoride in a greater amount than that present in the hydrogen fluoride-carbon dioxide complex will result in a decreased yield of isopropylbenzene, more diisopropylbenzenes being present.

Example III

A mixture consisting of 4 moles of toluene and 12.3 moles of hydrogen fluoride is placed in an apparatus similar to that set forth in Example I above. Carbon dioxide is pressured in until it represents 26 wt. percent of the catalyst phase. During this time, the temperature of the autoclave is maintained at about 5° C. by means of an ice bath. Following this, ethylene is pressured in during a period of about one hour, the total amount of ethylene being about 1 mole. At the end of one hour addition time, during which time the mixture is continuously stirred, cooling is discontinued, the carbon dioxide is released, and the autoclave is purged by means of a stream of nitrogen being passed therethrough for a period of two hours. Thereafter, the autoclave is opened and the reaction product is recovered. The product is then treated in a manner similar to that set forth in Example I above, the desired product comprising ethyltoluene being recovered after distillation.

When the alkylation of toluene with ethylene is repeated using a catalyst system which contains only 21 moles of hydrogen fluoride rather than the complex of the present invention, it is found that the yield of the desired ethyltoluene is less than that which is obtained when using the catalyst complex of the present invention, more diethyltoluenes being present.

Example IV

In this example, 4 moles of ethylbenzene and 12 moles of hydrogen fluoride are placed in a turbomixer autoclave which is maintained at a temperature of about 5° C. by means of an ice bath. Carbon dioxide is then pressured in until an amount equal to that of 30 wt. percent of a catalyst phase has been added. Thereafter, ethylene is charged to the reactor which is continuously stirred, said addition of ethylene being accomplished during a period of approximately one hour. At the end of this contact time, the introduction of ethylene is discontinued, the carbon dioxide is released, and a stream of nitrogen is passed through the product for a period of two hours to purge the hydrogen fluoride therefrom. The autoclave is opened and the reaction product is recovered and water washed. The autoclave is then washed with a pentane solvent, the wash being added to the bulk product. The organic layer is separated from the aqueous acid layer and neutralized by the addition of calcium carbonate. After filtration, the solvent and unreacted ethylbenzene are removed by distillation, the desired product comprising diethylbenzene being recovered therefrom. It is found that when repeating the above experiment utilizing only hydrogen fluoride as a catalyst for the alkylation reaction, a lesser amount of diethylbenzene will be formed.

Example V

In this example, a mixture of toluene and hydrogen fluoride is treated in a manner similar to the above set forth examples, that is, by placing said mixture in an autoclave and thereafter charging thereto carbon dioxide and propylene. After a contact time of 1 hour at a temperature of about 5° C. has been completed, the carbon dioxide is released, the autoclave is purged with nitrogen and the reaction mixture is recovered. Treatment of the reaction mixture in a manner similar to that set forth in Example I above will result in obtaining a relatively large yield of isopropyltoluene.

However, when alkylating toluene with propylene under similar conditions by using a catalyst consisting only of hydrogen fluoride, the yield of isopropyltoluene will be less than that which is obtained when using a catalyst system comprising a hydrogen fluoride-carbon dioxide complex, the hydrogen fluoride being present in the complex in a considerably smaller amount than that which is present when using only hydrogen fluoride per se as the catalyst.

I claim as my invention:

1. In a process for the liquid phase alkylation of an aromatic hydrocarbon by condensing said hydrocarbon with an alkylating agent in the presence of an alkylation catalyst at a temperature in the range from about −20° to about 150° C. and a pressure in the range of from about 10 to 2,000 pounds per square inch, the improvement which comprises utilizing as said catalyst a hydrogen fluoride-carbon dioxide complex containing from about 0.1 to about 95 wt. percent hydrogen fluoride.

2. The process as set forth in claim 1 in which said alkylating agent is an olefinic hydrocarbon.

3. The process as set forth in claim 1 in which said alkylating agent is an aldehyde.

4. The process as set forth in claim 2 in which said olefinic hydrocarbon is propylene.

5. The process as set forth in claim 3 in which said aldehyde is acetaldehyde.

6. The process as set forth in claim 1 in which said aromatic hydrocarbon is benzene, said alkylating agent is propylene, and the alkylated aromatic hydrocarbon is isopropylbenzene.

7. The process as set forth in claim 1 in which said aromatic hydrocarbon is toluene, said alkylating agent is ethylene, and the alkylated aromatic hydrocarbon is ethyltoluene.

8. The process as set forth in claim 1 in which said aromatic hydrocarbon is toluene, said alkylating agent is acetaldehyde, and the alkylated aromatic hydrocarbon is 1,1-ditolylethane.

9. The process as set forth in claim 1 in which said aromatic hydrocarbon is ethylbenzene, said alkylating agent is ethylene, and the alkylated aromatic hydrocarbon is diethylbenzene.

10. The process as set forth in claim 1 in which said aromatic hydrocarbon is toluene, said alkylating agent is propylene, and the alkylated aromatic hydrocarbon is isopropyltoluene.

References Cited

UNITED STATES PATENTS

| | | | |
|---|---|---|---|
| 2,439,228 | 4/1948 | Sturrock et al. | 260—668C |
| 2,885,452 | 5/1959 | Schmerling | 260—668C |
| 2,908,729 | 10/1959 | McCaulay | 260—671P |

CURTIS R. DAVIS, Primary Examiner

U.S. Cl. X.R.

260—671